(12) United States Patent
Vrame

(10) Patent No.: US 6,573,449 B2
(45) Date of Patent: Jun. 3, 2003

(54) FLOOR STAND FOR ELECTRICAL BOX HAVING PLASTER RING

(75) Inventor: Peter A. Vrame, Barrington Hills, IL (US)

(73) Assignee: Paul A. Vrame, Crystal Lake, IL (US)

( * ) Notice: Subject to any disclaimer, the term of this patent is extended or adjusted under 35 U.S.C. 154(b) by 0 days.

(21) Appl. No.: 09/841,867

(22) Filed: Apr. 25, 2001

(65) Prior Publication Data

US 2002/0157850 A1 Oct. 31, 2002

(51) Int. Cl.[7] ................................................. H01H 9/02

(52) U.S. Cl. .................... 174/58; 174/63; 248/906; 220/3.9

(58) Field of Search ............................... 174/58, 50, 63, 174/48; 220/4.02, 3.6, 3.9, 3.8, 475; 52/220.7, 220.8; 248/906, 300, 311.2; 312/242, 245

(56) References Cited

U.S. PATENT DOCUMENTS

| | | | | |
|---|---|---|---|---|
| 1,835,633 | A | * 12/1931 | Calderwood | .................. 174/63 |
| 3,767,151 | A | * 10/1973 | Seal et al. | ................. 174/58 X |
| 4,399,922 | A | * 8/1983 | Horsley | ..................... 220/3.6 |
| 5,098,046 | A | 3/1992 | Webb | |
| 5,224,673 | A | * 7/1993 | Webb | ..................... 248/906 X |
| 5,288,041 | A | 2/1994 | Webb | |
| 5,330,137 | A | 7/1994 | Oliva | |
| 5,423,499 | A | 6/1995 | Webb | |
| 5,931,425 | A | 8/1999 | Oliva | |
| 6,098,939 | A | 8/2000 | He | |

* cited by examiner

*Primary Examiner*—Dean A. Reichard
*Assistant Examiner*—Dhiru R Patel
(74) *Attorney, Agent, or Firm*—Wood, Phillips, Katz, Clark & Mortimer

(57) ABSTRACT

A floor stand having two parallel uprights mounts an electrical box having a plaster ring, via fasteners passing between the parallel uprights, whereby the parallel uprights are clamped between the plaster ring and the electrical box.

4 Claims, 1 Drawing Sheet

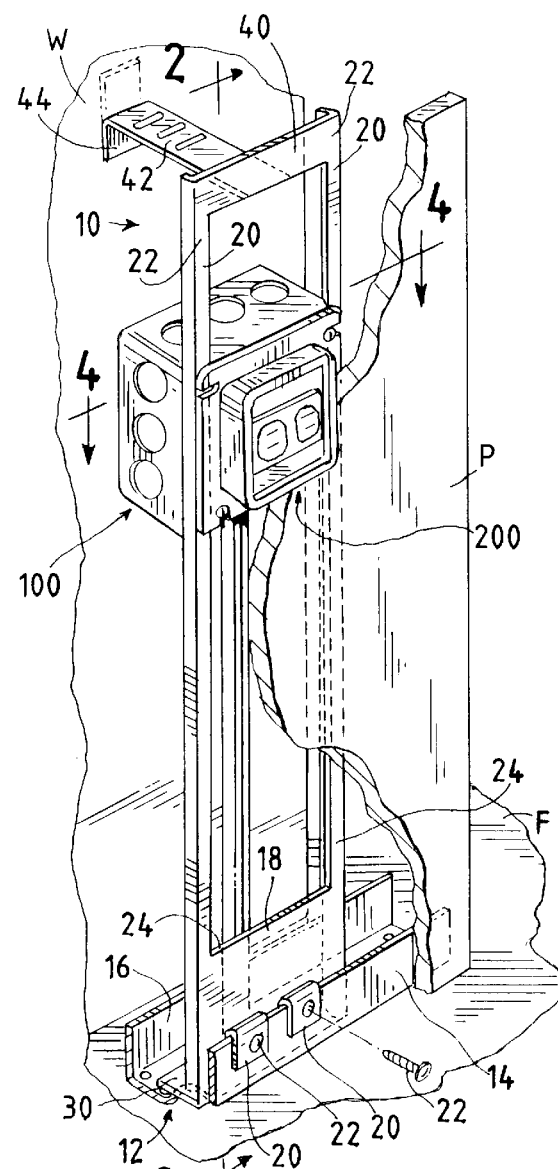
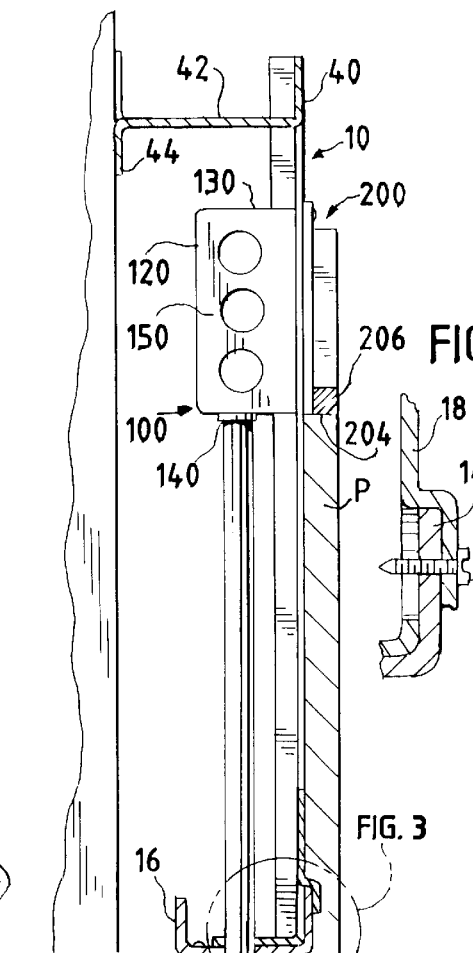
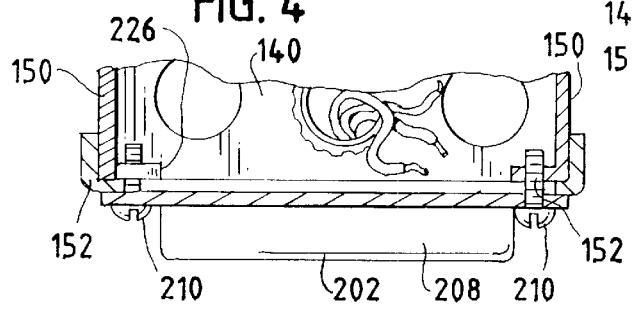

FLOOR STAND FOR ELECTRICAL BOX HAVING PLASTER RING

TECHNICAL FIELD OF THE INVENTION

This invention pertains to a floor stand for mounting an electrical box having a plaster ring. The floor stand permits the electrical box having the plaster ring not only to be horizontally positionable, because the floor stand does not fasten to a stud, but also to be vertically positionable anywhere within a useful range of positions above a floor.

BACKGROUND OF THE INVENTION

Commonly, an electrical box having a plaster ring defines a generally rectangular cavity, which is bounded by an upper wall, a lower wall, and two lateral walls, each said wall having a distal edge, and by a back wall. The plaster ring, which may be also called a mud ring or a faceplate, defines a generally rectangular frame, which is bounded by an upper member, a lower member, and two lateral members. The plaster ring is fastenable to the electrical box, via fasteners passing through slots in the plaster ring into holes in ears on the electrical box, so that the upper member of the plaster ring is aligned with the distal edge of the upper wall of the electrical box, so that the lower member of the plaster ring is aligned with the distal edge of the lower member of the plaster ring is aligned with the distal edge of the lower wall of the electrical box, and so that each of the lateral members of the plaster ring is aligned with the distal edge of one of the lateral walls of the electrical box.

For mounting an electrical box having a plaster ring, as described above, is has been known to use a floor stand (such as the EZ Floor Stand Box Support, which is available commercially from S-P Products, Inc. of Elk Grove Village, Ill.) to which the electrical box is fastened by fasteners passing through holes in the back wall of the electrical box, into holes selected from series of holes spaced vertically and incrementally along the floor stand, or to which the plaster ring is fastened by fasteners passing through slots or holes in the plaster ring, into holes selected therefrom. The floor stand permits the electrical box having the plaster ring not only to be horizontally positionable, because the floor stand does not fasten to a stud, but also to be vertically positionable at incrementally spaced positions above a floor.

For mounting an electrical box having a plaster ring, as described above, between two studs, its is known to use a mounting bracket defining an elongate frame having an upper member and a lower member and mounting the electrical box having the plaster ring, via fasteners passing between the upper and lower members. See U.S. Pat. Nos. 5,330,137 and 5,931,425, both to John H. Oliva.

SUMMARY OF THE INVENTION

This invention provides a floor stand for mounting an electrical box having a plaster ring, as described above, in an improved manner. The floor stand has two parallel uprights, each having an upper end and a lower end, and has an upper structure bridging the upper ends of the two parallel uprights and a lower structure bridging the lower ends of the parallel uprights. The parallel uprights are positionable between the lateral members of the plaster ring and the distal edges of the lateral walls of the electrical box. Preferably, each of the parallel uprights of the floor stand has an outer, backturned, stiffening flange.

When the plaster ring is fastened to the electrical box, via fasteners passing between the parallel uprights of the floor stand, so that the upper member of the plaster ring is aligned with the distal edge of the upper wall of the electrical box, so that the lower member of the plaster ring is aligned with the distal edge of the lower wall of the electrical box, and so that each of the lateral members of the plaster ring is aligned with the distal edge of one of the lateral walls of the electrical box, the parallel uprights of the floor stand can be thus clamped between the lateral members of the plaster ring and the distal edges of the lateral walls of the electrical box.

This invention also provides a novel combination of an electrical box having a floor stand, as described above, and a floor stand, as provided by this invention. The plaster ring is fastened to the electrical box, via fasteners passing between the parallel uprights, so that the upper member of the plaster ring is aligned with the distal edge of the upper wall of the electrical box, so that the lower member of the plaster ring is aligned with the distal edge of the lower wall of the electrical box, and so that each of the lateral members of the plaster ring is aligned with the distal edge of one of the lateral walls of the electrical box, whereby the parallel uprights of the floor stand are clamped between the lateral members of the plaster ring and the distal edges of the lateral walls of the electrical box.

BRIEF DESCRIPTION OF THE DRAWINGS

FIG. 1 is a partly fragmentary, perspective view of a floor stand mounting an electrical box having a plaster ring.

FIG. 2 is a sectional view taken along line 2—2 in FIG. 1, in a direction indicated by arrows.

FIG. 3 is an enlarged detail, which is taken from a region encircled in FIG. 2.

FIG. 4 is a sectional view taken along line 4—4 in FIG. 1, in a direction indicated by arrows.

FIG. 5 is an enlarged, fragmentary, exploded detail taken from FIG. 1.

DETAILED DESCRIPTION OF THE ILLUSTRATED EMBODIMENT

As shown in the drawings, a floor stand 10 constituting a preferred embodiment of this invention is stamped from sheet metal, such as galvanized steel. The floor stand 10, which is mounted on a floor F in a known manner, is useful for mounting an electrical box 100 having a plaster ring 200, either before or after a drywall panel P is installed and whether or not studs (not shown) have been installed, so that a front portion 202 of the plaster ring 200 projects frontwardly through an aperture 204 cut in the drywall panel P. As shown, drywall-finishing material 206, which installers call "mud", is applied around the front portion 202 of the plaster ring 200.

As shown, the floor stand 10 is mounted to a channel 12, which is fastened to the floor F and which has a front flange 14 and a back flange 16, via two spaced tabs 20 projecting from a lower portion 18 of the floor stand 10 and being clipped over the front flange 14, to which each of the spaced tabs 20 is fastened via a screw. The floor stand 10 permits the electrical box 100 having the plaster ring 200 to be horizontally positionable, because the floor stand 10 does not fasten to a stud, and permits the electrical box 100 having the plaster ring 200 to be vertically positionable anywhere within a useful range of positions above the floor 12, which may be a concrete, wooden, or other floor.

Being conventional, the electrical box 100 defines a generally rectangular cavity, which is bounded by a back wall 120, an upper wall 130 having a distal edge 132, a lower wall 140 having a distal edge 142, and two lateral walls 150, each lateral wall 150 having a distal edge 152. Being conventional, the plaster ring 200 defines a generally rectangular frame 208, which frames the front portion 202 and which is bounded by an upper member 230, a lower member 240, and two lateral members 250. The plaster ring 200 is fastenable to the electrical box 100, Via fasteners 210, such as screws, which pass through slots 212 in the plaster ring 200, into holes 214 in ears 220 extending from the electrical box 100.

Being improved by this invention, the floor stand 10 has two parallel uprights 20, each having an upper end 22 and a lower end 24 and each having an outer, backturned, stiffening flange 26. The lower portion 18 of the floor stand 10 has a flange 30, which extends backwardly and which is seated within the channel 12, between the front flange 14 and the back flange 16. The floor stand 10 has an upper structure 40 including a flange 42 terminating in a tab 44, which is downturned, as shown in full lines, or which may be alternatively upturned, as shown in broken lines. The tab 44 is adapted to be permanently attached by fasteners 46, such as screws and anchors, to a concrete or other wall W behind the floor stand 10.

As shown, when the plaster ring 200 is fastened to the electrical box 100, the fasteners 210 pass between the parallel uprights 20 of the floor stand 10. Further, the upper member 230 of the plaster ring 200 is aligned with the distal edge 132 of the upper wall 130 of the electrical box 100, the lower member 240 of the plaster ring 200 is aligned with the distal edge 142 of the lower wall 140 of the electrical box 100, and each of the lateral members 250 of the plaster ring 200 is aligned with the distal edge 152 of one of the lateral walls 140 of the electrical box 100. Thus, the parallel uprights 20 of the floor stand 10 are clamped between the lateral members 250 of the plaster ring 200 and the distal edges 152 of the lateral walls 150 of the electrical box 100 having the plaster ring 200.

The floor stand 10 permits the electrical box 100 having the plaster ring 200 not only to be horizontally positionable, because the floor stand 10 does nor fasten to a stud, but also to be vertically positionable anywhere within a useful range of positions above the floor F.

What is claimed is:

1. A floor stand for mounting an electrical box having a plaster ring, the electrical box defining a generally rectangular cavity, which is bounded by an upper wall, a lower wall, and two lateral walls, each said wall having a distal edge, the plaster ring defining a generally rectangular frame, which is bounded by an upper member, a lower member, and two lateral members and which is fastenable to the electrical box, the floor stand having two parallel uprights, each having an upper end and a lower end, the floor stand having an upper structure bridging the upper ends of the two parallel uprights and a lower structure bridging the lower ends of the parallel uprights, the parallel uprights being positionable between the lateral members of the plaster ring and the distal edges of the lateral walls of the electrical box, whereby when the plaster ring is fastened to the electrical box, via fasteners passing between the parallel uprights of the floor stand, so that the upper member of the plaster ring is aligned with the distal edge of the upper wall of the electrical box, so that the lower member of the plaster ring is aligned with the distal edge of the lower wall of the electrical box, and so that each of the lateral members of the plaster ring is aligned with the distal edge of one of the lateral walls of the electrical box, the parallel uprights of the floor stand can be thus clamped between the lateral members of the plaster ring and the distal edges of the lateral walls of the electrical box.

2. The floor stand of claim 1 wherein each of the parallel uprights of the floor stand has an outer, backturned, stiffening flange.

3. A combination comprising an electrical box having a plaster ring, and a floor stand mounting the electrical box having the plaster ring, the electrical box defining a generally rectangular cavity, which is bounded by an upper wall, a lower wall, and two lateral walls, each said wall having a distal edge, the plaster ring defining a generally rectangular frame, which is bounded by an upper member, a lower member, and two lateral members and which is fastenable to the electrical box, the floor stand having two parallel uprights, each having an upper end and a lower end, the floor stand having an upper structure bridging the upper ends of the two parallel uprights and a lower structure bridging the lower ends of the parallel uprights, the parallel uprights being positioned between the lateral members of the plaster ring and the distal edges of the lateral walls of the electrical box, the plaster ring being fastened to the electrical box, via fasteners passing between the parallel uprights of the floor stand, so that the upper member of the plaster ring is aligned with the distal edge of the upper wall of the electrical box, so that the lower member of the plaster ring is aligned with the distal edge of the lower wall of the electrical box, and so that each of the lateral members of the plaster ring is aligned with the distal edge of one of the lateral walls of the electrical box, whereby the parallel uprights of the floor stand are clamped between the lateral members of the plaster ring and the distal edges of the lateral walls of the electrical box.

4. The combination of claim 3 wherein each of the parallel uprights of the floor stand has an outer, backturned, stiffening flange.

* * * * *